US009870359B2

(12) United States Patent
Lehmann et al.

(10) Patent No.: US 9,870,359 B2
(45) Date of Patent: Jan. 16, 2018

(54) SYSTEM AND METHOD FOR DYNAMIC DOCUMENT RETENTION

(71) Applicant: Software AG, Darmstadt (DE)

(72) Inventors: Marc Lehmann, Blieskastel (DE); Christoph Wagmann, Bexbach (DE)

(73) Assignee: Software AG, Darmstadt (DE)

( * ) Notice: Subject to any disclaimer, the term of this patent is extended or adjusted under 35 U.S.C. 154(b) by 298 days.

(21) Appl. No.: 14/453,897

(22) Filed: Aug. 7, 2014

(65) Prior Publication Data

US 2016/0041972 A1 Feb. 11, 2016

(51) Int. Cl.
*G06F 17/30* (2006.01)
*G06Q 10/10* (2012.01)

(52) U.S. Cl.
CPC ....... *G06F 17/30011* (2013.01); *G06Q 10/10* (2013.01); *G06Q 10/101* (2013.01)

(58) Field of Classification Search
None
See application file for complete search history.

(56) References Cited

U.S. PATENT DOCUMENTS

| 8,527,468 B1 * | 9/2013 | Crafford | G06F 17/30011 707/662 |
| 2005/0099398 A1 * | 5/2005 | Garside | G06F 17/242 345/173 |
| 2008/0154969 A1 * | 6/2008 | DeBie | G06F 17/30085 |
| 2010/0050231 A1 * | 2/2010 | Kilday | G06Q 10/107 726/1 |

* cited by examiner

*Primary Examiner* — Alex Gofman
*Assistant Examiner* — Umar Mian
(74) *Attorney, Agent, or Firm* — Posz Law Group, PLC

(57) ABSTRACT

A system for dynamic document retention, in a multi-owner environment that includes a document management system, registers, in a retention service, plural different document owners for a same document. The system receives a different owner-defined document retention policy for the document from each of the document owners, and registers, in a plug-in registry, the policies. In response to a scheduler or a document owner, the system triggers an update of a document retention policy, adds/deletes a document owner from the document, and/or deletes the document when there are no remaining document owners. The document management system includes a retention service that tracks the owners of the same document(s), the plug-in registry that tracks the different document retention policies of the different document owners, and an optional scheduler. The event-based retention policies can be responsive to events occurring internal to or external to the document management system.

25 Claims, 12 Drawing Sheets

SYSTEM AND METHOD FOR DYNAMIC DOCUMENT RETENTION

TECHNICAL FIELD

The technical field relates in general to document management systems (DMS).

BACKGROUND

Documents stored in a document management system (DMS) can generally be classified into two main categories: permanent documents and temporary documents. A permanent document is stored without any time limitation. It does not have an expiration date and exists until someone actively triggers its deletion. A temporary document, in contrast, has an expiration date and is stored only for a limited time period. After the expiration date, the temporary document is automatically deleted, without requiring any further user interaction.

In a traditional DMS, the lifetime of a document is defined by a document retention policy, also known as data retention policy. A document retention policy is a corporate policy intended to ensure that necessary documents are adequately protected and maintained and to ensure that documents that are no longer needed or are of no value are discarded at the proper time. Given that the concept of a data retention policy is well known and widely used, there exists a wide range of applications that support such policies.

SHAREPOINT is a web application platform developed by Microsoft. It comprises a multi-purpose set of web technologies backed by a common technical infrastructure and is the de-facto standard for enterprise document management. It is used to store and track electronic documents or images of paper documents. It is capable of keeping track of different document versions created by different users. In addition to being a platform for digital record management systems that meet government and industry compliance standards, SHAREPOINT also provides the benefit of a central location for storing and collaborating on documents, which can significantly reduce emails and duplicated work in an organization.

The document retention policy of SHAREPOINT, also known as an information management policy, is a set of rules for a type of content. Each individual rule within an information management policy is a policy feature. SHAREPOINT includes several predefined policy features that organizations can use individually or in combination to define information management policies for their documents. The expiration policy feature can be used to specify that certain types of content expire on a particular date or within a calculated amount of time after some document activity, such as creating or editing.

DOCUMENTUM is an enterprise content management platform developed by EMC Corporation. The core of DOCUMENTUM is a repository in which the content is stored securely under compliance rules in a unified environment, although content may reside on multiple servers and physical storage devices within a networked environment. DOCUMENTUM provides a suite of services, including document management, collaboration, search, content classification, input management and customer communication management. The document retention policy of DOCUMENTUM, also known as retention policy services (RPS), is also entirely time-based. The policy is applied to objects, and it denotes the length of time until the next action is invoked.

The TIVOLI Storage Manager (TSM), developed by IBM, is a family of software products designed to help organizations manage and protect their data by simplifying backup administration. It is a centralized, policy-based, enterprise class, data backup and recovery software and enables users to insert objects not only via backup, but also through space management and archiving tools. It allows retrieval of the same data via similar restore, recall, and retrieve methods.

When using policy-based retention, TSM automatically assigns a service class to each newly created document. The service class is determined using a set of document rules that may be customized by the administrator. A service class determines the duration of the retention period for every document that is assigned to it, that means TSM automatically evaluates service classes to determine how long a document is protected in the archive.

The document retention policy in TSM can be either time-based or event-based. In case of a time-based policy, the retention period can be specified in days, weeks, months or years. A document expires after the configured retention period has ended. In case of an event-based policy the retention period is controlled on the basis of the occurrence of one or more events. Using this method, one can specify a minimum retention period and how long a document is retained after an event is signaled. The document expires depending on when the event occurs.

Considering these products currently available on the market, it is readily apparent that all of the solutions used by these products, without any exception, are based on the concept of a time-based data retention policy or a very limited event-based data retention policy. When using a time-based policy, a user, typically the DMS administrator, can specify the lifetime of: (1) a single document, (2) all documents in a folder, or even (3) all documents in the DMS. Lifetime can typically be specified as a fixed date, specified as a time period, or calculated by the DMS. The policy is maintained centrally in the DMS and there is no way for DMS users to deviate from the enforced policy. While a time-based policy might be sufficient in situations where the document owner is a human being, it does not fit our needs in a complex multi-application environment in which the document owner may be an application and where documents must be retained until a certain event occurs, e.g. a business process finishes its execution or a model that references the document is deleted.

One or more embodiments discussed herein can address the aforementioned problems, with traditional systems, by moving from the centralized, time-based approach to a more flexible distributed counterpart. A generic plug-in feature for retention policies allows applications to register individual policies that can better cover their needs. The registered policies may still be time-based, but optionally they may also be event-based which provides more control of document lifetime while enabling the actual document owner to define and register one or more data retention policies.

SUMMARY

Accordingly, one or more embodiments provide a method, system and/or non-transitory computer readable medium for dynamic document retention. Accordingly, an embodiment provides a method for dynamic document retention in a multi-owner environment that includes a document management system. The method includes registering, by a processor, in a retention service, a plurality of document owners as owners of a same document; registering, by the processor, in a plug-in registry, each of different owner-defined document retention policies as registered retention policies for the plurality of document owners; triggering, by the processor, a retrieval, from at least one of the plurality of document owners, of an update to at least one of the registered retention policies, which are registered in the plug-in registry; modifying, by the processor, in the retention service, document owners identified as the owners of the same document, and adjusting a document-owner-count for the same document that counts the document owners; and deleting, archiving, or moving to a recycle bin, by the processor, the same document when: it is determined that all of the different owner-defined document retention policies which are registered for the plurality of document owners of the same document agree that the document can be deleted, archived or recycled, when there are two or more document owners of the same document; or it is determined from the document-owner-count that there are no document owners of the same document; or it is determined that an override document retention policy is assigned to the same document which forces the same document to be archived, deleted, or moved to the recycle bin. The retention service and the plug-in registry are part of a document management system, and the owner-defined document retention policies are definable as external-event-based which are responsive to events occurring external to the document management system.

In another embodiment, the processor, in the retention service, modifies the document owners identified as the owners of the same document and adjusting the document-owner-count, in response to at least one of: a request, from one of the document owners, to the retention service, to register ownership of the same document which already exists; a request, from one of the document owners, to the retention service, to create the same document which does not already exist; and a request, from one of the document owners, to the retention service, to end ownership of the same document.

Another embodiment includes triggering, by the processor, a retrieval, from at least one of the plurality of document owners, of an update to at least one of the registered retention policies, which are registered in the plug-in registry. The triggering of the update occurs in response to a scheduler based on a predetermined schedule, or in response to the one or more document owners, and the scheduler is part of the document management system.

Yet another embodiment includes permitting, by the processor, in the retention service, owner-types of the plurality of document to include: an application external to the document management system, a user, and a process external to the document management system.

Another embodiment uses, by the processor, a default retention policy as the retention policy of any one of the plurality of document owners which is not determined to provide the owner-defined document retention policy.

In another embodiment, different revisions of the same document are definable as having different document owners.

Still another embodiment tracks, by the processor, in a registry service, each of plural retention services in the multi-owner environment.

In another embodiment, the deleting, archiving, or moving to the recycle bin of the same document is responsive to deleting, archiving, or moving to the recycle bin of the same document by at least one of the document owners.

Another embodiment further includes determining, by the processor, in the retention service, whether the document can be deleted, archived or recycled by retrieving, by the processor, from the plug-in registry, all of the different owner-defined document retention policies, for all of the document owners that are owners of the same document, based on a look-up of all of the document owners of the document, so as to determine whether all of the different owner-defined document retention policies which are registered for the plurality of document owners of the same document agree.

According to another embodiment, the retention service adds or removes one or more document owners from the document, and determines whether the document can be deleted based on whether there is any document owner which remains for the document.

Accordingly, still another embodiment provides a method for dynamic document retention in a multi-owner environment of a document management system, comprising registering, by a processor, one or more document owners for a document in a retention service; receiving, by the processor, an owner-defined document retention policy for the document from each of the document owners; registering, by the processor, each owner-defined document retention policy at a central plug-in registry; triggering, by the processor, an update of one or more owner-defined retention policies registered at the central plug-in registry; adding, by the processor, one or more document owners to the document in the retention service; deleting, by the processor, one or more document owners from the document in the retention service; and deleting, by the processor, the document when there are no remaining document owner. The retention service, the central plug-in registry, and a scheduler can be part of the document management system. The triggering can occur in response to the scheduler or the one or more document owners. The owner-defined document retention policies may be time-based or event-based; and the event-based owner-defined document retention policies are responsive to events occurring inside or outside of the document management system.

An embodiment provides a system, for dynamic document retention in a multi-owner environment that includes a document management system, comprising a memory; and a processor cooperatively operable with the memory, and configured to, based on instructions stored in the memory, to perform a method according to one or more of the above embodiments.

Still another embodiment provides a non-transitory computer readable medium, which can perform a method according to one or more of these embodiments.

One, or a combination of more than one, or all, of the above embodiments, can be combined and provided as a single document.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. Introduction

Figure 1:
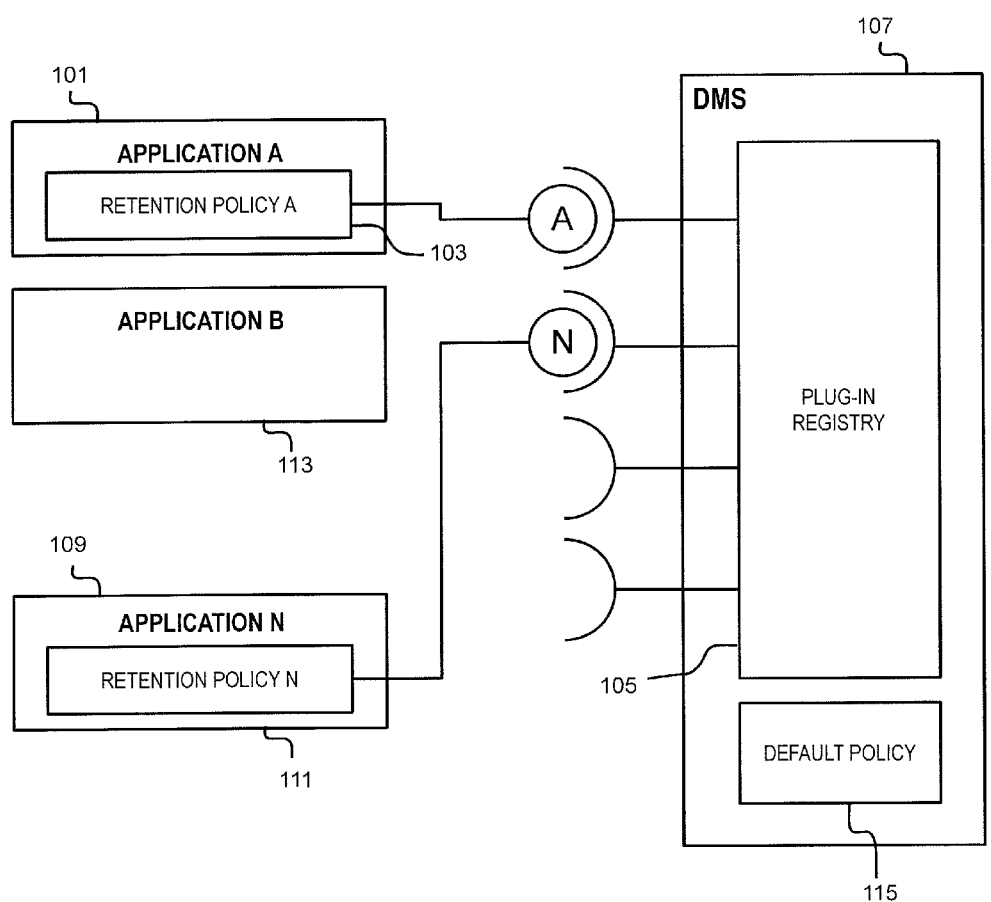
FIG. 1 is a block diagram illustrating the registration of custom retention policies at a plug-in registry.

In overview, the present disclosure concerns a dynamic DMS which intends to maximize the flexibility of systems that manage the retention of documents. The system can be achieved for example, by a generic plug-in feature for retention policies that enables applications (or individual users) to register individual policies, which can be adjusted during the lifetime of the document and in response to an actual situation or event.

Discussed herein is the concept of access of the self-defined retention policy by the document owner through a generic plug-in stakeholder feature that makes inversion of control from the DMS to the actual owner possible. Also, described herein is the modification of the document's one or more stakeholders during the lifetime of the document. Another feature is that the document management system can react to events which occur outside of the realm of the document management system. The pull feature can occur when a scheduler triggers an update of the retention policy. The push feature can occur when the owner proactively updates the retention policy.

The dynamic document retention system may be particularly useful in the world of complex multi-application environments, but as discussed herein, the application and implementation of the presently described system is not limited to such environments.

There are many advantages to the dynamic document retention system. For example, a temporary document that has to be reviewed and approved by a responsible person can be moved and deleted as soon as it has reached a special state, such as a "state of approval." Another advantage is that a temporary document that is referenced in a business process can be deleted if the process has terminated unexpectedly. This helps to alleviate the retention of outdated data. Yet another advantage is that a permanent document with multiple stakeholders (including, for example, multiple, independent processes) cannot be deleted until each stakeholder has confirmed the deletion.

II. Problem Presentation

Each of the aforementioned traditional DMS is based upon the shared idea of a time-based retention policy, thus they all share the same shortcomings and do not provide a sufficient level of flexibility. There are at least three major drawbacks.

First, a time-based retention as used by all of the discussed conventional solutions has been found to be insufficiently flexible in practice. In these systems, a fixed time period is used to specify document lifetime, which may either result in a premature deletion of documents or lead to obsolete documents still being retained. In order to avoid these problems, a conventional DMS necessitates retention periods to be checked and updated frequently. While the "event-based" retention component of TSM may be a first step in the right direction, it can only react to events that occur inside the DMS, for example when a document is being edited. TSM is unable to gather information pertaining to events that occur outside the DMS.

The second major drawback which has been found in connection with conventional systems is that they use a centralized policy which does not allow for an inversion of control. The policy is enforced by the DMS and cannot be influenced by the actual document owner (user or application), which the inventors have found to be a highly desirable feature for fine-grained control of document lifetime.

The third main drawback to these conventional systems is that a document may have exactly one policy or no policy at all. While this structure may work in a traditional DMS, it does not fit the needs of an environment where a document might have multiple owners, all having their own agenda, and thus their own specific requirements for retention of a jointly owned document.

None of the existing DMS approaches provide a retention policy flexible enough to fit the needs of the current multi-stakeholder environment. In most cases, retention periods specified in the usual ways will not match the desired lifetime of the document because the concepts of these policies do not match the real-world needs.

One or more embodiments discussed herein can address the aforementioned problems of traditional systems by combining an event-based retention system with a generic stakeholder feature.

III. Overview and Aspects of the Approach

In the present dynamic document retention system, a document owner can make use of a unique, self-defined retention policy because control of document lifetime is shifted from the DMS to the actual document owner. To allow this, a generic plug-in feature that allows document owners to register individual policies is provided.

A document owner is an entity that has a legitimate interest in the lifetime of a document. A document can have multiple owners, and each of the owners can have a need, among other things, for the document to exist. The interests of the multiple owners in the continued existence of the document do not necessarily start and/or terminate at the same point in time.

A document owner can be, for example, any of the following:

Application: A web application or any other client application that has a special interest in the lifetime of a document. For example, this could be any word processor tool, especially when used in a collaborating enterprise environment.

User: A real person (human) that has uploaded the document.

Process: Any business process that references or processes a document within a process flow.

A. Registration of Custom Retention Policies and Document Owners

Reference is made to FIG. 1, which illustrates how a document owner can register his retention policy at the central plug-in registry. The central plug-in registry provides an extension point that allows tailoring of policies that can be anything, starting from a simple calculation up to a remote call against the owning application. There can be exactly one retention policy per application. The registration of a policy is optional. A default policy can be used in the event that there is no custom policy for a particular application.

In FIG. 1, application A 101 has registered its retention policy A 103 at the central plug-in registry 105 which is located in the DMS 107. Application N 109 has also registered its own retention policy N 111 at the central plug-in registry 105. Application B 113 does not have a designated retention policy. A default policy 115 may be used for Application B113. Accordingly, the DMS is aware that applications A and N 101, 109 have retention policies 103, 111, respectively, which are to be used for retention instead of the default policy 115

Figure 2:
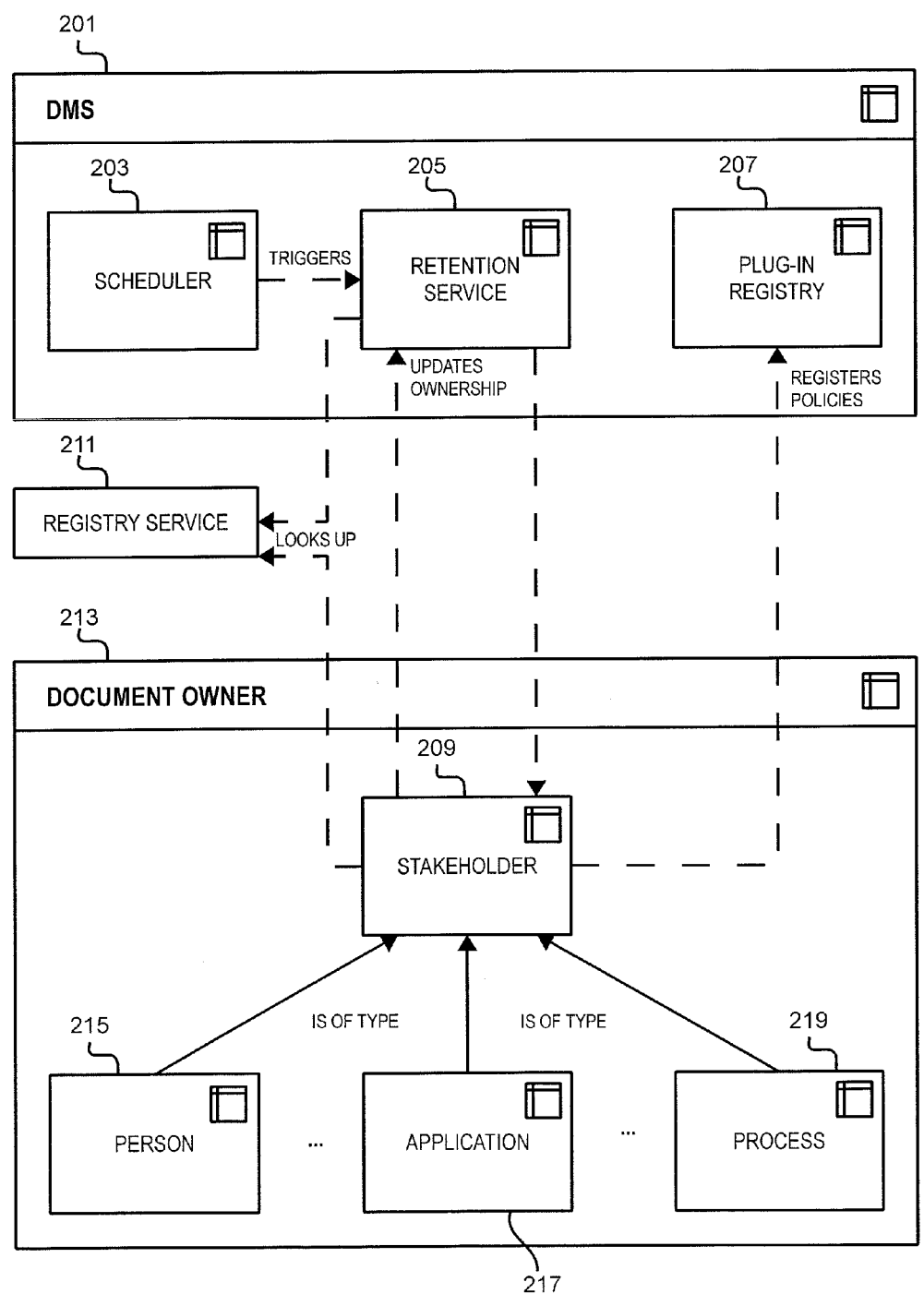
FIG. 2 is a block diagram illustrating an overview of infrastructure components.

Referring now to FIG. 2, an overview of the infrastructure components will be discussed and described. The DMS 201 comprises a scheduler 203, a retention service 205, and a plug-in registry 207. While a registry service 211 keeps track of every retention service 205 in a distributed multi-tenant environment, the retention service 205 can be triggered externally such as from the document owner 213 or implicitly such as by an internal scheduler 203. The main functionality of the retention service 205 is to add or remove an owner from a document and to decide if a document can be deleted. In order to perform this function, the retention service 205 retrieves the registered retention policies from the plugin-registry 207. The document owner 213 comprises a stakeholder 209 that can be any one of three types of stakeholders, including a person 215, an application 217, or a process 219.

Figure 3:
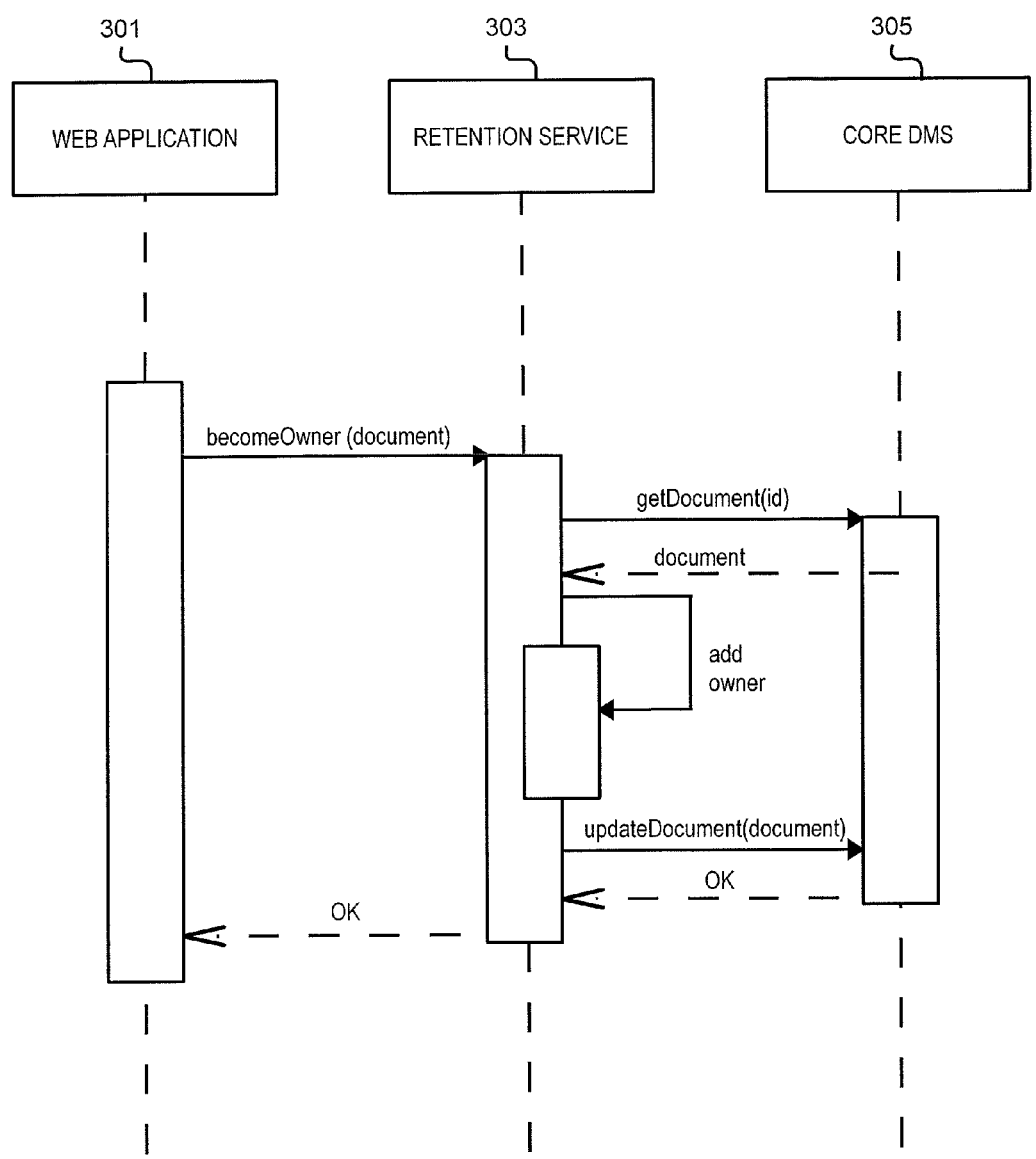
FIG. 3 is a data flow diagram illustrating registration of a document owner for an existing document.

An application 217 can be the document owner of any number of documents. There can be any number of document owners for a single document. Referring now to FIG. 3, which depicts the registration of a document owner for an existing document, a web application 301 is seeking to become the owner of an existing document, called "document." In order to become a document owner, the web application 301 registers/requests ownership at a central retention service 303 (using, for example, the command "becomeOwner(document)") that, in turn, updates those stakeholders which are identified as the document owners of the referenced document. In the case of an existing document, the retention service 303 retrieves the document from the core DMS 305, adds the owner (in this case, web application 301) and then updates the document ownership information in the core DMS 305. Once the core DMS 305 indicates that this new ownership information has been registered, an acknowledgement or completion message (represented as an "OK" message) is sent to the retention service 303 that, in turn, sends and "OK" message to the web application 301.

Figure 4:
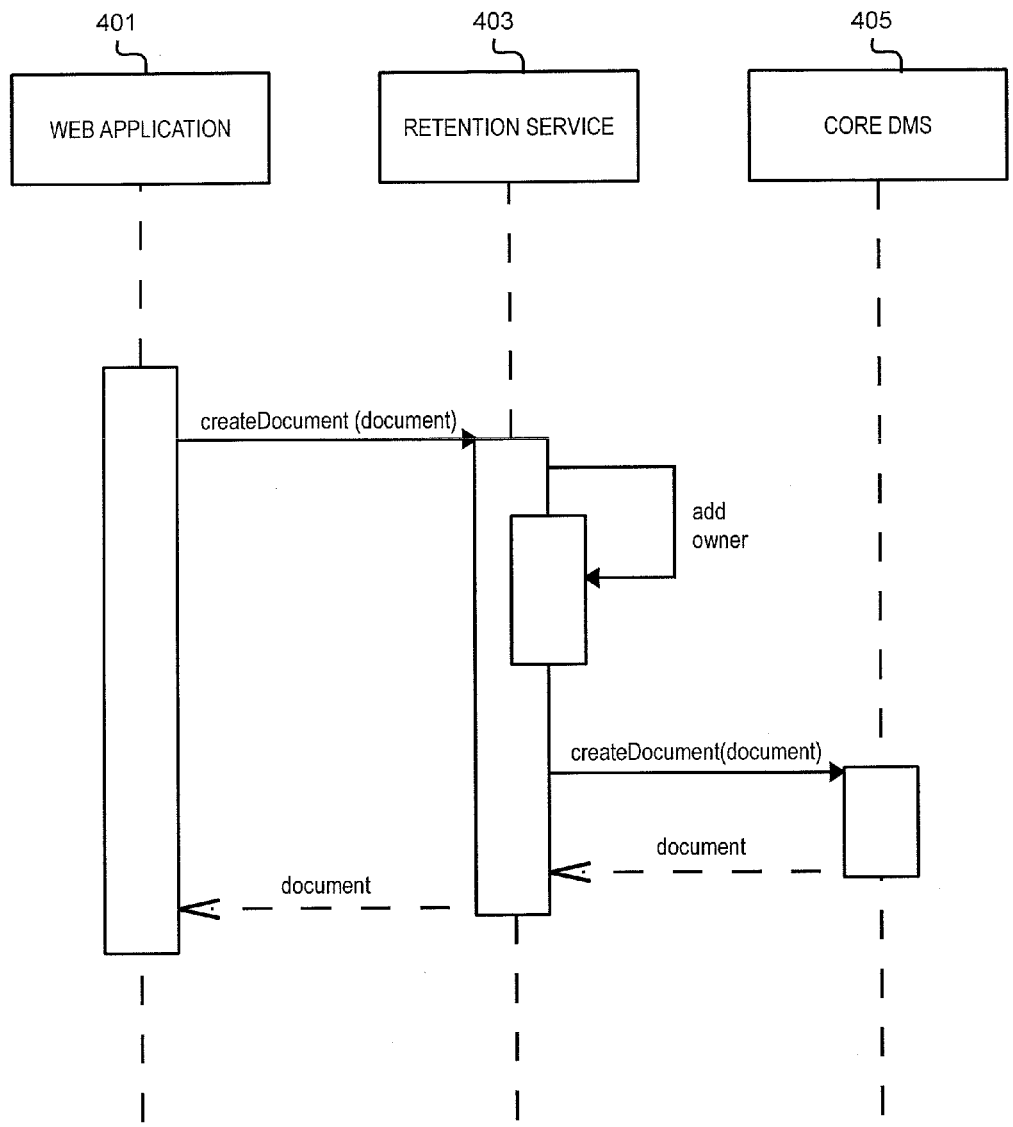
FIG. 4 is a data flow diagram illustrating registration of a document owner for a new document.

Referring now to FIG. 4, which depicts the registration of a document owner for a new document, a web application 401 is seeking to become the owner of a new document, called "document." In case of a newly created document, the uploading application can automatically become the first document owner. The new document request is sent to the retention service 403 using a command to create a document such as "createDocument (document)," and the retention service 403 designates the web application 401 as the owner of the new document. The new document request is then sent to the core DMS 405 for creation and registration. The newly created document is then sent back to the retentions service 403 that, in turn, sends the document to the web application 401.

The following components are desirable parts of the owner registration process:
a registry service,
a retention service and
a policy registry, including a plug-in feature.

While the registry service can keep track of every retention service, of which there may be many such as in a distributed multi-tenant environment, the retention service itself can process each of the ownerships of a document. The retention service can be triggered externally from the owners themselves or implicitly by an internal scheduler. The main functionality of the retention service is to add or remove an owner from a document and to decide if a document can be deleted. To be able to perform this action, the retention service can retrieve the registered retention policies from the plugin-registry.

B. Pull and Push Mechanism

Figure 5:
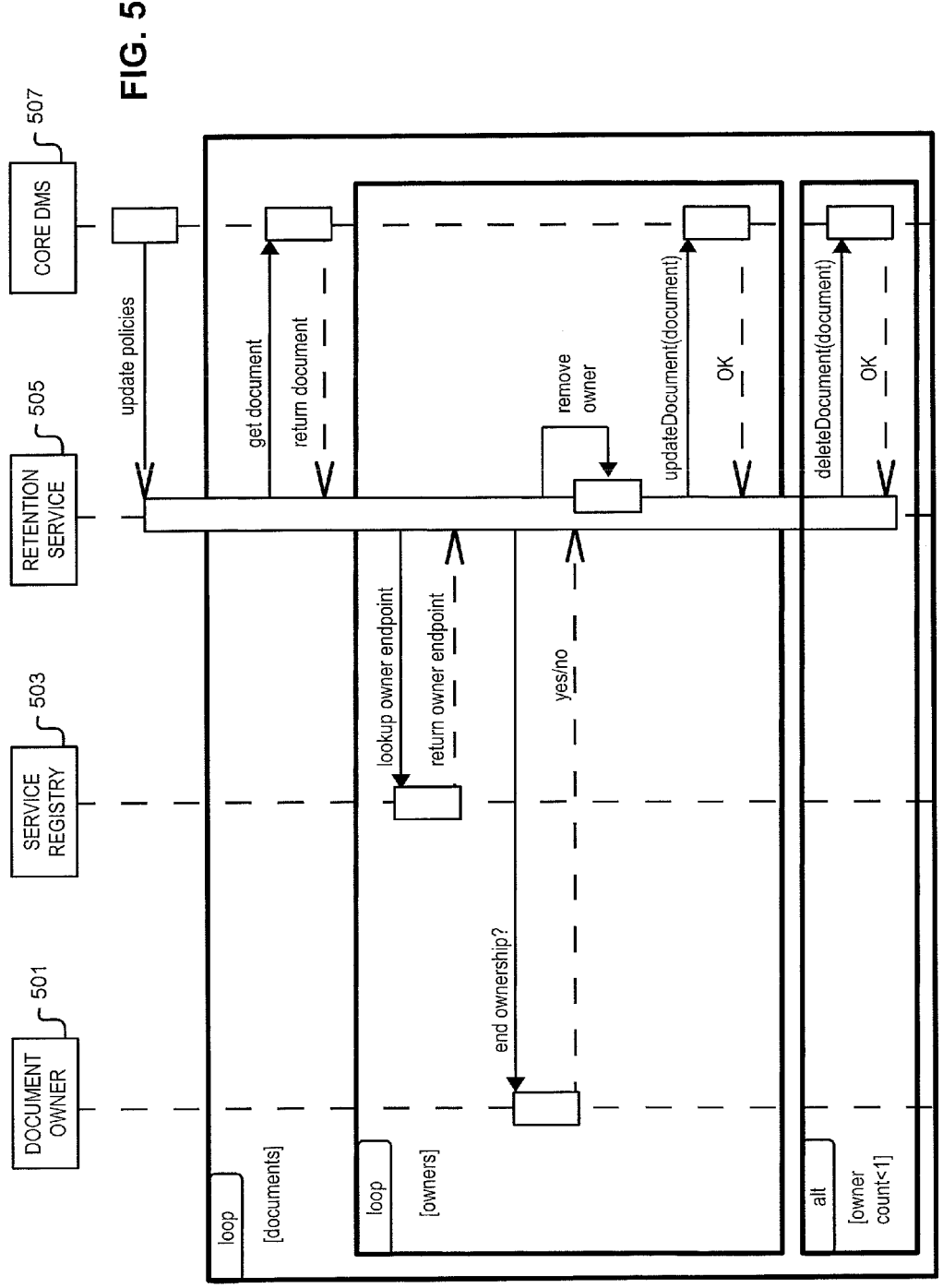
FIG. 5 is a data flow diagram illustrating the Pull feature when the Scheduler triggers an update of the retention policy.

The creator of a document retention policy can specify if the policy is updated using a pull mechanism or a push mechanism (sometimes referred to herein as a pull feature or a push feature, respectively). Referring to FIG. 5, the pull feature occurs when the internal scheduler located in the core DMS 507 triggers the update of a retention policy. When using the pull feature, a scheduling component in the core DMS 507 can periodically trigger an update of retention policies. The retention service 505 receives the trigger and, in turn, updates the retention policy of the documents. To do this, first the retention service 505 fetches all the temporary documents from the core DMS 507. For each document, the retention service 505 then looks up the endpoint of the document owners in the service registry 503. Using the fetched endpoints for the document owners of the document, the retention service 505 then queries each document owner 501 for an update of its retention policy. In a case when the document owner 501 no longer needs the document, the retention service can remove the queried owner 501 from the document which was retrieved and is now handled by the retention service 505, and decrement the owner count which is tracked by the retention service 505 on a per-document basis. The owner count will be maintained to indicate how many owners there are for the document; each document owner will have its document retention policy for the document. The retention service 505 can determine whether there is any document owner left for the document, for example, using an owner count stored by the retention service 505 for the document. If there is no other document owner left for the document, the document can be deleted by the retention service 505 sending a command such as a deleteDocument(document) instruction to the core DMS 507. If there are still other owners of the document left, the document is only updated, such as by the retention service 505 sending a command to update the document (e.g., updateDocument(document)). An example of this pull mechanism is a business process that finished its execution. A document used in the process can be deleted as soon as the process has ended. The process itself cannot proactively trigger document deletion once it has ended.

Figure 6:
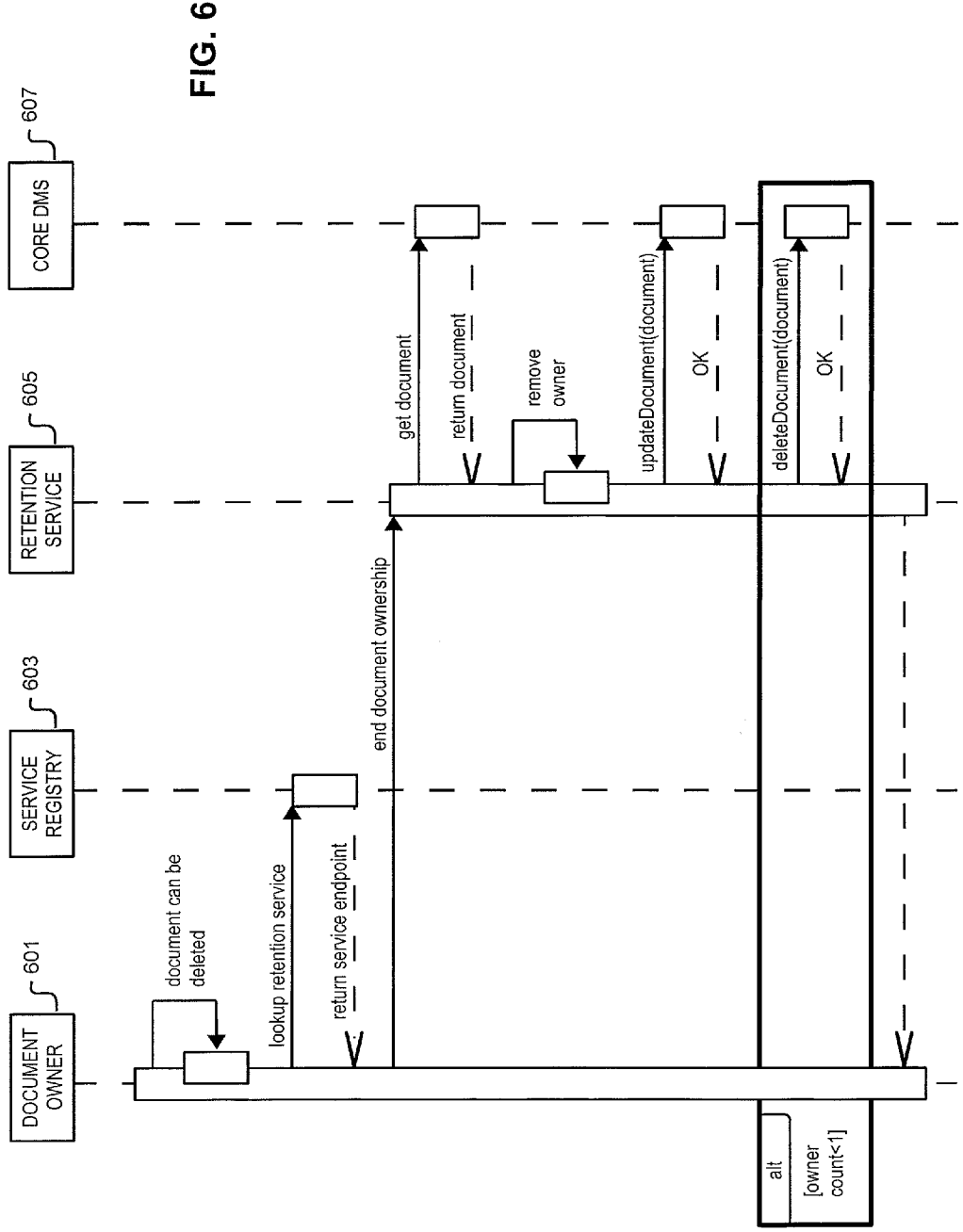
FIG. 6 is a data flow diagram illustrating the Push feature when the Owner proactively updates the retention policy.

In comparison to the previously described pull mechanism, a document owner may itself determine that a document can be deleted. This push mechanism is depicted in FIG. 6, in which the document owner 601 has determined that a document can be deleted. When using the push mechanism, the document owner 601 does a lookup at the service registry 603 to find the endpoint of the retention service. Using the fetched endpoint, the owner 601 can then inform the retention service 605 about the end of the owner's document ownership. The retention service 605, in turn, can start the process to determine if this document can be deleted. The first step to determine whether the document can be deleted is for the retention service 605 to issue a command to retrieve the document from the core DMS 607 and then the retention service 605 can remove the specified owner 601 from the document. The retention service 605 can determine whether there is any document owner left for the document. If there is no other document owner left, the retention service 605 can issue a command to the core DMS 607 to delete the document, here represented by deleteDocument(document). If there are other document owners left, the document is only updated, by the retention service 605 issuing to the core DMS 607 a command such as updateDocument(document). An example of this push mechanism is an ARIS model with one or more attached documents. When the model is deleted, ARIS triggers a push mechanism proactively.

C. Adding a Document

The first time a document is created, the creator can automatically become the first owner of the document. If the document is created as a permanent document, the document can remain in the document storage until a user with appropriate access rights explicitly deletes it. If the document is a temporary document, the uploading application can define a policy, which defines the retention policy for this document, as discussed previously in connection with, e.g., FIG. 3. If the owner does not explicitly specify a policy, then the default policy associated with the uploading application can be used instead.

Figure 7:
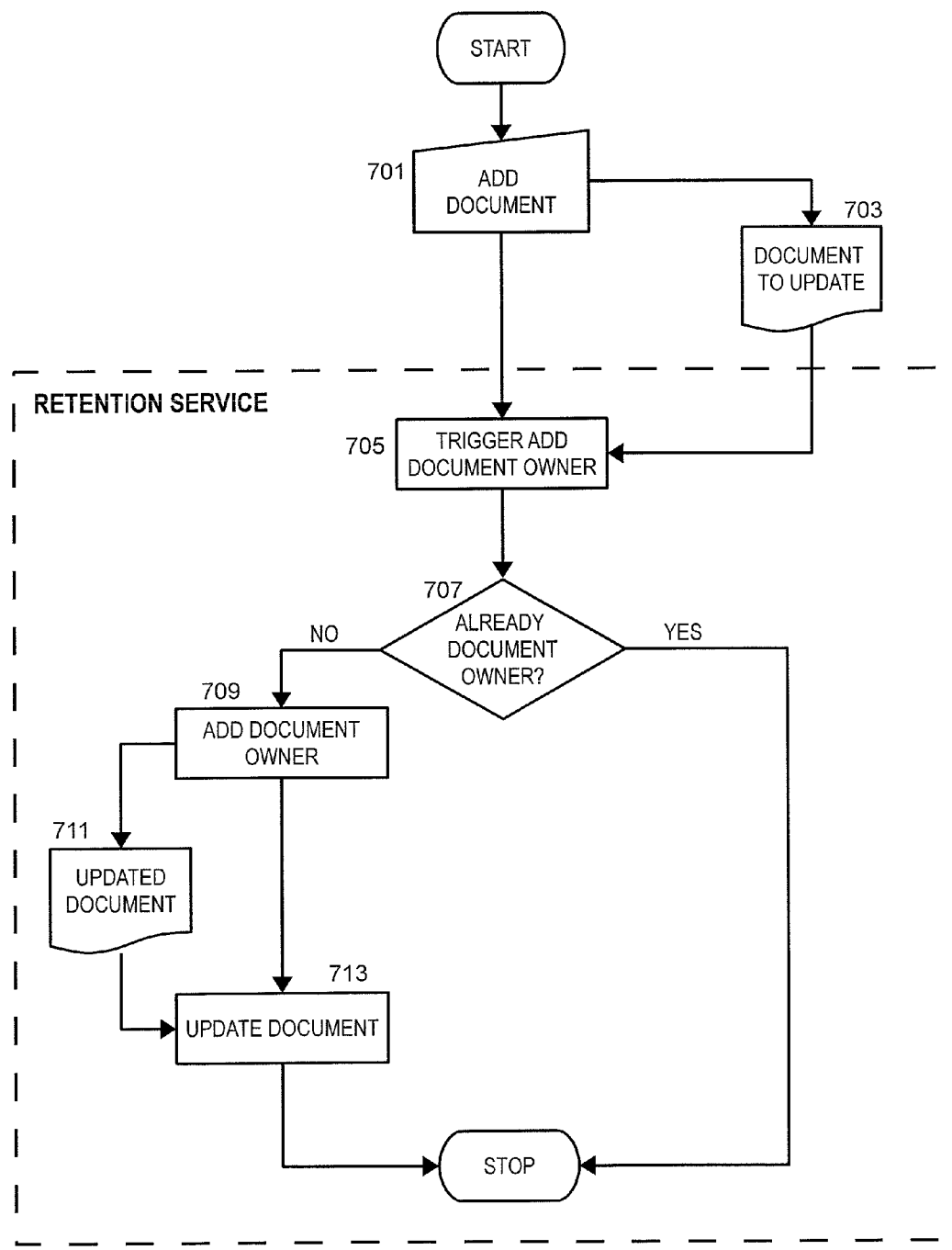
FIG. 7 is a flow chart illustrating registration of a document owner for a newly created document.

The process to become the owner of a newly created document is illustrated for example in the flow chart of FIG. 7. When an instruction 701 to create or add a new document 703 is received, the retention service triggers 705 the functionality within the retention service to register the uploading application as a new document owner. If it is determined 707 that the document exists already, and that the application is not already a document owner of the document, the application is added 709 as an additional owner to the document. If it is determined 707 that the application is already an owner of this document 703, then nothing has to be done. Consequently, if the application is not yet registered as a document owner, it becomes a new owner and is added 709 to the list of already owners. After this registration process in which the document owner is added, the document is updated 713 with the additional document owner and the updated document 711 is stored. The process can stop.

D. Deleting a Document

Figure 8:
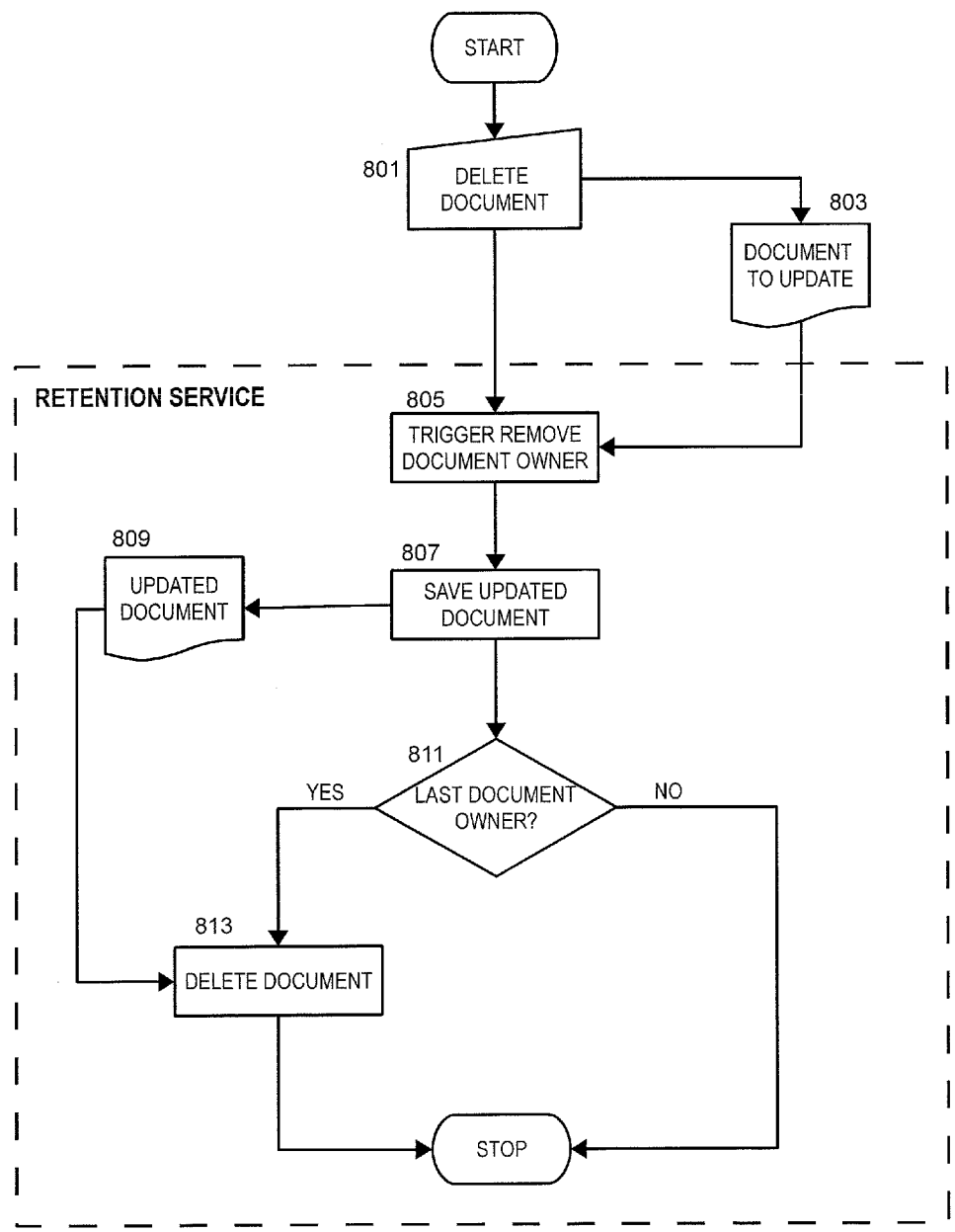
FIG. 8 is a flow chart illustrating deletion of a document owner from the existing document.

When a document is deleted by an application, either by using the push or the pull feature, the document update process can be started to remove the document owner. The detailed steps of the delete process are shown for example in the flow chart illustrated in FIG. 8. When an instruction 801 to delete a document 803 is received by the retention service, the retention service can trigger 805 an owner removal task and updates the document by removing the requesting application from the document owners of the document. The retention service can save 807 the updated document 809, with the document owners no longer listing the application that deleted the document. If it is determined 811 that there is no additional owner left for the document, the document can be deleted 813. If it is determined 811 that the owner is not the last owner of the document, then it is not yet possible to delete the document. In this case, only the owner has been removed 805 without actually deleting the document 809. Then, the process can stop. It may be convenient to provide an override functionality in which administrators can force a deletion of documents without regard to consideration of any retention policy or document owner. This override function is discussed in detail in the following discussion regarding implementation.

Deletion of a document is just one example of how a document with no further owners can be handled, however this concept can also be applied to other approaches such as moving the document to an archive or moving it to a recycle bin.

IV. Implementation

As briefly described in the previous section, when a user uploads a document, the application that the user used to upload this document can automatically become the first owner of this document. If the user does not specify a custom retention policy, a standard policy is added, or the document is marked as using a default retention policy. In an embodiment, the default retention policy may be to delete a document as soon as there is no document owner left for that document. That means, when the system receives an instruction, for example from a user, to delete a document, the document is deleted if, and only if, there are no other owners registered on the document or when all other owners already marked the document for deletion.

A. Adding and Deleting a Document Owner from a Document Revision

Additional document owners may use other retention policies and may be registered at a later date, for example, when a user uploads a new revision of a document in a particular application. In this case, the uploading application can also become an owner of the document. This is considered in the implementation discussed herein. To mitigate the problem created by revisions of a document, an implementation can add and/or delete documents on a per-revision basis. Examples of handling document retention in connection with document revisions are illustrated in FIG. 9 and FIG. 10.

Figure 9:
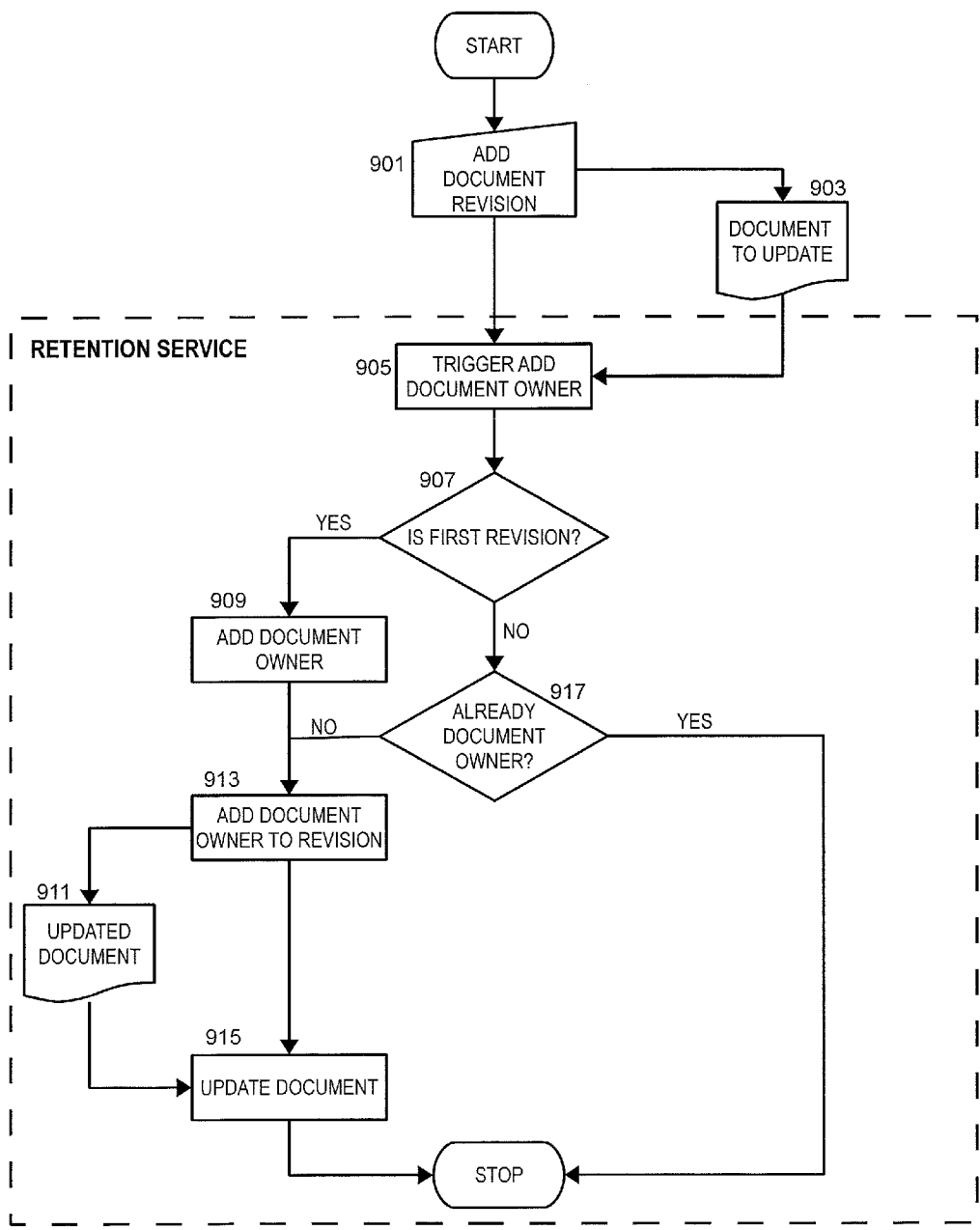
FIG. 9 is a flow chart registration of a document owner for a document revision.
Figure 10:
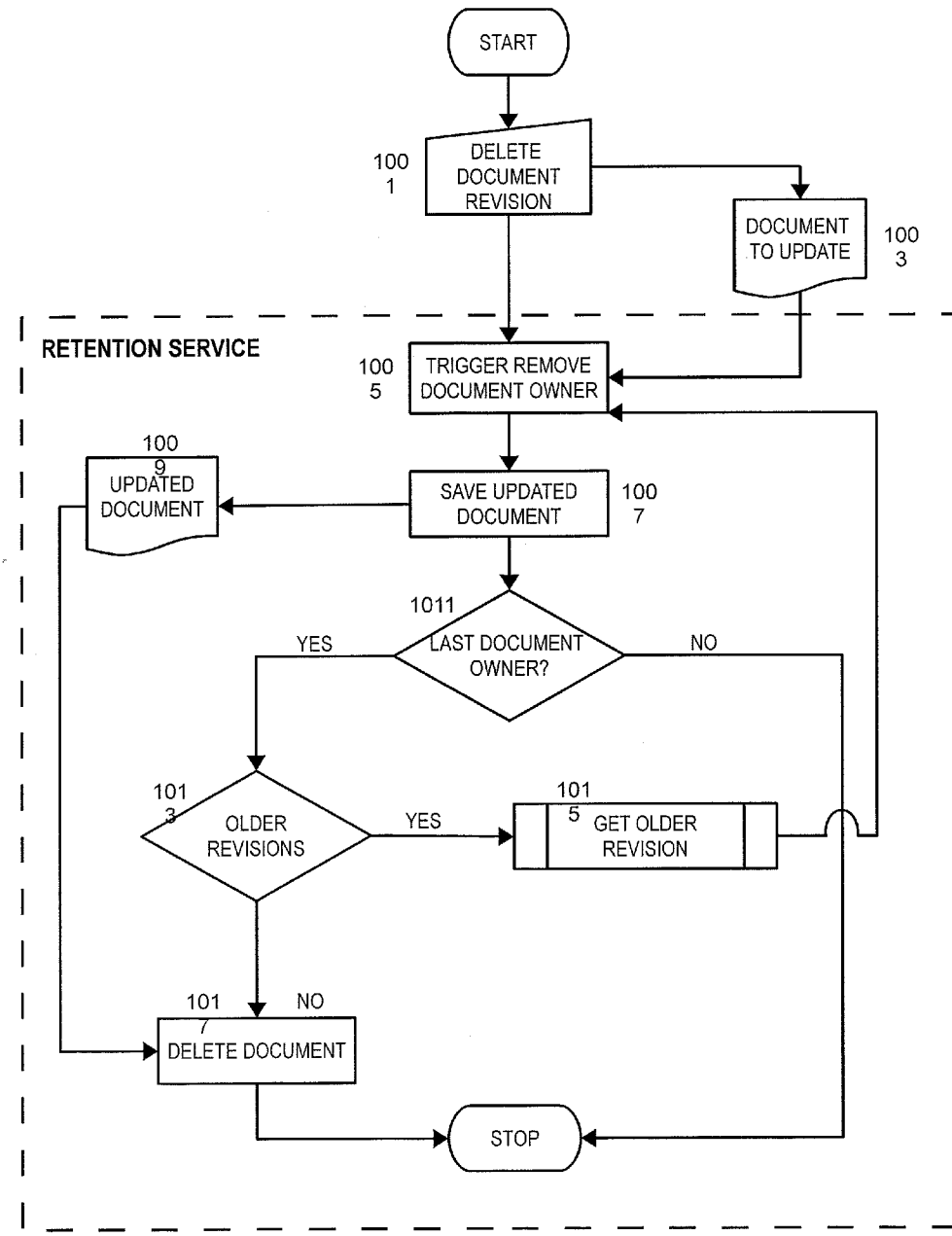
FIG. 10 is a flow chart illustrating deletion of a document owner from a document revision.

Referring to FIG. 9, a process for the registration of a document owner for a document revision can begin when an instruction 901 to add a document revision 903 is received. The retention service can trigger 905 the addition of a document owner. The process to add a document owner can determine 907 whether this is the first revision of the document. If it is determined 907 that this is the first revision of the document, then the document owner is added 909 to the updated document 911 and also added 913 to the document revision. The updated document 911 is then stored 915. If it is determined 907 that this is not a first revision of the document, then the retention service determines 917 whether the stakeholder (that is, the user, application, or process) is already an owner of the document which is to be update 903d. If the user, application, or process (stakeholder) is not already an owner, then the retention service adds 913 the stakeholder as a document owner of the document revision. If, however, the user, application, or process (stakeholder) is already an owner of the document to update 903, then no action is taken to update the document owner(s) of the document. In this regard, merely adding or deleting a document owner for a document or a document revision is not treated as a revision of the document itself and hence does not cause another document revision.

A force delete functionality can be provided to administrators to allow deletion of one or more or all document revisions without considering the existing retention policies. The implementation on a per-revision basis is one possible implementation of the concept, but one can of course think of a simpler implementation without revisions. For a revision based implementation one has to consider various scenarios. If there are multiple revisions of a document and a document owner that is only registered for a specific revision, such as revision two, only the specific revision is deleted if the owner is not registered anymore after being deleted.

A feature that may be provided which allows an administrator of such a system to have ultimate control by overriding user-defined policies. Having user-defined policies is very flexible and overcomes deficiencies of conventional technology, however, there can be a danger that a user might mistakenly define a policy which would retain a document for an undesirably long period of time or even forever; or a user might unknowingly violate a norm which calls for documents to be archived instead of deleted, for example. Consequently, an override document retention policy can be provided, so that an administrator can enforce an ultimate control which overrides all owner-defined document retention policies. The administrator can be registered as a document owner and the override document retention policy can be registered to the administrator in accordance with the principals discussed above which results in one of the policies for the document being the administrator's override document retention policy; and/or the override document retention policy can be assigned directly to the document. The override document retention policy can be assigned upon creation of the document, or can be added thereafter, for example by the administrator. The override document retention policy can be defined by the administrator as with the other document retention policies described herein, and further can be specified as an override-type document retention policy. Such functionality may be desirably limited to certain roles, such as an administrator of the system. The override-type document retention policy can override all non-override-type document retention policies. This means, in the event of a conflict between policies or rules among the retention policies of the document owners of the same document, the policy or rules of a document retention policy designated as an override-type document retention policy control, if such a type of policy exists. For example, the override document retention policy rules can be used instead of, or can be based on, the non-override-type document retention policy rules.

Another considerable solution is to delete all revisions only if no further owners are left for any revision of the document. In this solution, the document is not deleted if other owners are still registered for one or more specific revisions. As exemplified in the flow chart of FIG. 10, one embodiment can delete single document revisions individually. That means as soon as a document owner deregisters itself or is deregistered by an application then the delete revision process can be triggered. If no owners for a particular revision are left, then the revision can be deleted.

In reference to FIG. 10, the process for deletion of a document owner from a document revision can begin when an instruction 1001 to delete a document revision 1003 is received by the retention service. The retention service triggers 1005 the removal of a document owner for the document revision. The document owner for the revision is deleted, and the updated document 1009 is saved 1007. The process determines whether this is the last document owner for the revision. If it is determined 1011 that this is not the last document owner for the revision of the document, then no action is taken. If it is determined 1011 that this is the last document owner for the document revision, then the process determines 1013 whether one or more older revisions of the document exist. If there are older revisions of the document, then the older revisions are retrieved 1015 and then the process begins again when the retention service triggers 1005 the removal of the document owner from the retrieved older revision. If, however, there are no older revisions, then the document is deleted 1017. The process of FIG. 10 can be extended to encompass new revisions, in addition to older revisions.

Figure 11:
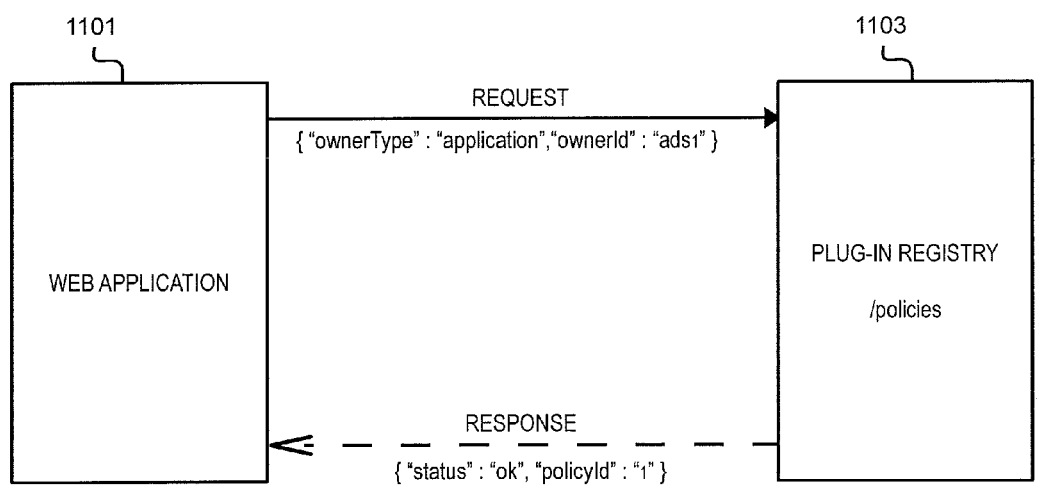
FIG. 11 is a data flow diagram illustrating an example of a policy registration process using HTTP requests with JSON payload.

New retention policies can be registered at the plug-in registry. The process of a policy registration is depicted in the example data flow diagram of FIG. 11. In this FIG. 11, a client application, for example a web application 1101, can register a new policy by sending a registration request to the remote interface of a plug-in registry 1103. The registration request can specify, among other things, the owner type, the application requesting the registration, and the owner ID. The plug-in registry 1103 then registers the new policy, and responds to the request with a unique policy ID, optionally indicating the success of the request (e.g., "OK").

The remote interface of the plug-in registry may be conveniently realized as a REST interface along the lines of the following example:

| Path | Method | Query Parameters | Request Body | Description |
|---|---|---|---|---|
| /policies | POST | — | Policy registration request | Registers a new retention policy |

Each policy owner can provide the following service provider interface as a REST interface, along the lines of the following example:

| Path | Method | Query Parameters | Description |
|---|---|---|---|
| /documents/<ID> | POST | Policy ID | Determines if the document should be retained |

The implementation of the policy can provide the functionality to decide whether a document can be released or not. In order to be used by the retention service, the policy can be registered in the plug-in registry, so that the retention service can lookup the policies, preferably dynamically at runtime. In contrast to the policy registration mechanism where policies are registered in the plug-in registry, an owner can register itself directly as a document owner, such as along the lines of the REST interface described below.

| Path | Method | Query Parameters | Description |
| --- | --- | --- | --- |
| /documents | POST | Owner ID, Policy ID | Creates a new document in the repository |
| /documents/<ID> | PUT | Owner ID, Policy ID | Updates an existing document |
| /documents/<ID>/ owners | POST | Owner ID, Policy ID | Registers document owner for an existing document |
| /documents/<ID>/ owners/<ID> | PUT | Policy ID | Changes the retention policy of a document owner |
| /documents/<ID>/ owners | GET | | Retrieves all registered document owners |
| /documents/<ID>/ owners/<ID> | DELETE | | Deletes the specified document owner |

The implementation and exchange based on HTTP and JSON as described here is just a convenient example. This can be implemented by any other feasible technology, such as a proprietary binary protocol and any other data format matching the needs of the used protocol.

B. Computer System Implementation Example

Figure 12:
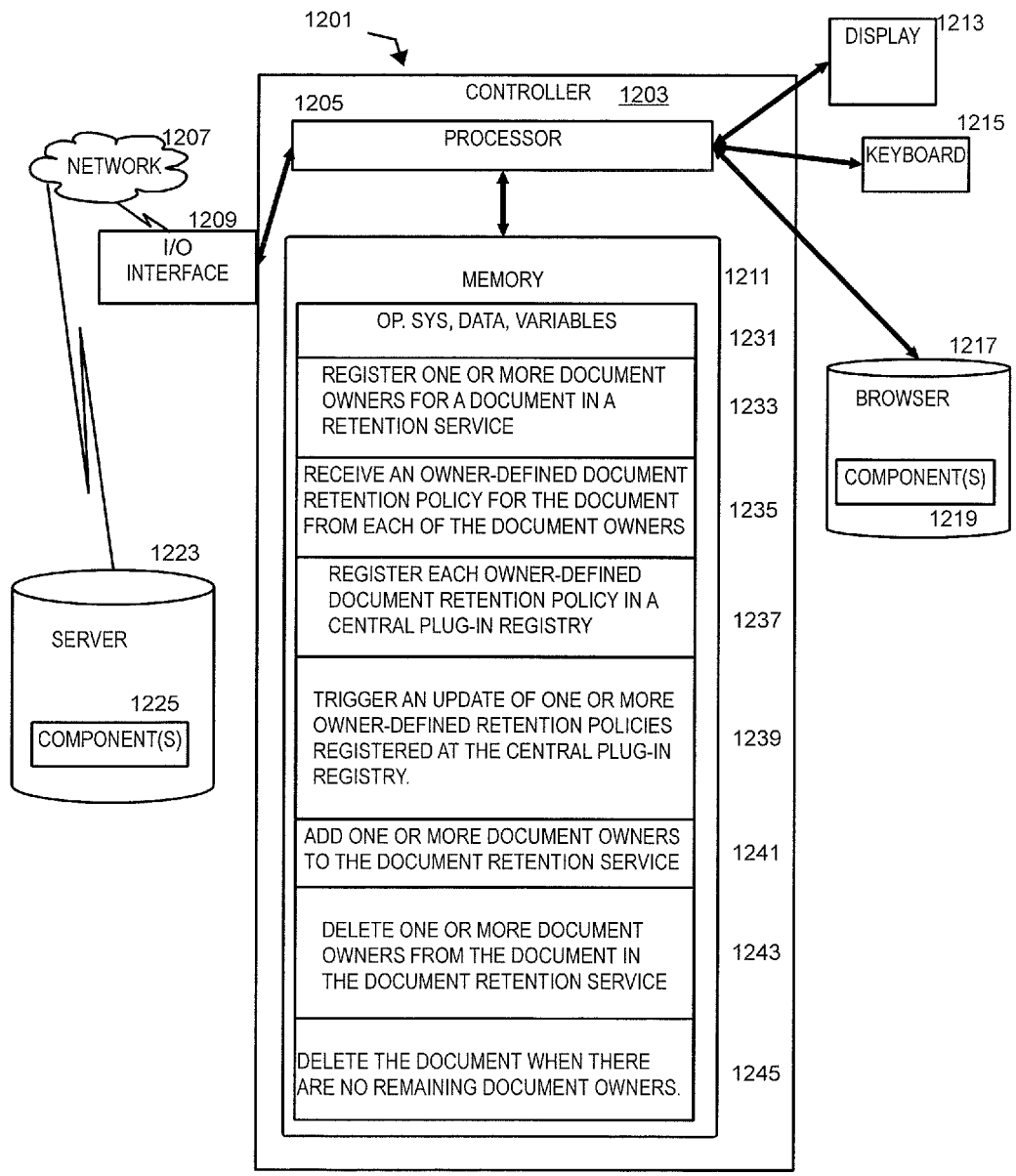
FIG. 12 is a block diagram that depicts relevant portions of a computer system for dynamic document retention.

FIG. 12 is a block diagram illustrating relevant portions of a computer system 1201, on which the system supporting the dynamic document retention policy may be implemented. The computer system 1201 may include one or more controllers 1203, a processor 1205, an input/output (i/o) interface 1209 for communication such as with a network 1207, a memory 1211, a display 1213 (optional), and/or a user input device (also optional) such as a keyboard 1215. Alternatively, or in addition to the keyboard 1215, a user input device may comprise one or more of various known input devices, such as a keypad, a computer mouse, a touchpad, a touch screen, a trackball, and/or a keyboard. The display 1213 may present information to the user by way of a conventional liquid crystal display (LCD) or other visual display, and/or by way of a conventional audible device (e.g., a speaker) for playing out audible messages. Portions of the computer system 1201 are well understood to those of skill in this area and have been omitted to avoid obscuring the discussion.

The processor 1205 may comprise one or more microprocessors and/or one or more digital signal processors. The memory 1211 may be coupled to the processor 1205 and may comprise a read-only memory (ROM), a random-access memory (RAM), a programmable ROM (PROM), and/or an electrically erasable read-only memory (EEPROM). The memory 1211 may include multiple memory locations for storing, among other things, an operating system, data and variables 1231 for programs executed by the processor 1205; computer programs for causing the processor to operate in connection with various functions such as registering 1233 one or more document owners for a document in a retention service; receiving 1235 an owner-defined document retention policy for the document from each of the document owners; registering 1237 each owner-defined document retention policy at a central plug-in registry; triggering 1239 an update of one or more owner-defined retention policies registered at the central plug-in registry; adding 1241 one or more document owners to the document in the retention service; deleting 1243 one or more document owners from the document in the retention service; and deleting 1245 the document when there are no remaining document owners for that document. The computer programs may be stored, for example, in ROM or PROM and may direct the processor 2005 in controlling the operation of the computer system 1201. Each of these functions is considered in more detail below, to the extent that it is not detailed elsewhere in this document.

The user may invoke functions accessible through the user input device such as the keyboard 1215. The user input device may comprise one or more of various known input devices, such as a keyboard (1215, illustrated) and/or a pointing device, such as a mouse; the keyboard 1215 may be supplemented or replaced with a scanner, card reader, or other data input device; and the pointing device may be a mouse, touch pad control device, track ball device, or any other type of pointing device.

Responsive to manual signaling from the user input device represented by the keyboard 1215, in accordance with instructions stored in memory 1211, and/or automatically upon receipt of instructions via the i/o interface 1209, the processor 1205 may direct the execution of the stored programs.

The computer system 1201 can utilize a browser 1217, which can include browser component(s) 1219.

The computer system 1201 can access a server 1223 on which is stored one or more components, here represented by server component(s) 1225. Although the components 1225 are illustrated as accessed over the network 1207, the components 1225 may be remotely and/or locally accessible from the computer system 1201, over a wired and/or wireless connection; the components 1225 do not need to be limited to a database or a server. Techniques are known for accessing components located in a server 1223, and the like.

With regard to the server 1223 and browser 1217, it may be noted that the computer programs stored in the memory 1211 are illustrated on the controller 1203. In a client/server embodiment, one or more of the computer programs conveniently may be distributed to the server, such as those marked "SERVER", and one or more of the computer programs conveniently may be distributed to a client side. In such a situation, the server 1223 may omit the client computer programs, and the client may omit the server computer programs. In another embodiment, the computer programs may be included on a non-client-server architecture, and the requests between client-servers may be omitted.

The processor 1205 may be programmed for registering 1233 one or more document owners for a document, in a retention service. This was explained above such as in connection with FIG. 2 to FIG. 4 and other figures, for example, when the document is created, or when a user instructs the system to become an owner of the document.

The processor 1205 may be programmed for receiving 1235 an owner-defined document retention policy, which is to be assigned to a particular document, from a document owner. A document owner can define its own retention policy for the document, and the owner provides the document retention policy to the plug-in registry. Details and example have been provided above.

The processor 1205 may be programmed for registering 1237 each owner-defined document retention policy at a central plug-in registry. As further discussed herein, the plug-in registry can store the details of one or more owner-defined document retention policies in connection with a particular document. The processor 1205 may be programmed for triggering 1239 an update of one or more owner-defined retention policies registered at the central plug-in registry. In this connection, the owner can update (for example, to modify, edit, delete, and/or add, details to or existence of) its own owner-defined document retention policy. The update, of the owner-defined retention policies, which is triggered, consequently might result in a new result as to whether the document should or should not be retained, based on the updated owner-defined retention policies of the owners of the same document.

Also, the processor 1205 may be programmed for adding 1241 one or more document owners to the document owners, which listed for the same document, in the retention service. Also, the processor 1205 may be programmed for deleting 1243 one or more document owners from document owners listed in the retention service for the same document. Also, the processor 1205 may be programmed for deleting 1245 the document when there are no remaining document owners for the same document. These were discussed above, such as in connection with FIG. 7 and FIG. 8 and the variations of FIG. 9 and FIG. 10.

As will be understood in this field, besides the functions discussed above, the memory 1211 can include other miscellaneous information in a miscellaneous database, not shown, along with the usual temporary storage and other instructions for other programs not considered herein.

The computer system 1201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 1205, memory 1211, a disk drive and/or removable storage medium are referred to as "computer-readable storage media" and provide non-transitory storage of computer programs and data.

In FIG. 12, the functionality of the computer system 1201 encompasses the retention service, the plug-in registry, and the registry service. It should be understood that FIG. 12 is described in connection with logical groupings of functions or resources. One or more of these logical groupings may be performed by different components from one or more embodiments. Likewise, functions may be grouped differently, combined, or augmented without parting from the scope. For example, it is possible that the registry service, the retention service, and/or the plug-in registry are distributed to other separate computer systems. Similarly, the present description may describe various databases or collections of data and information. One or more groupings of the data or information may be omitted, distributed, combined, or augmented, or provided locally and/or remotely without departing from the scope.

V. Glossary

Terms as used herein are intended to be interpreted first as understood to one of skill in the art of document management systems; and if not interpretable according to the DMS art, then interpreted next according to the art of computer science and information science; and only if not so interpretable, then according to a more general dictionary.

The claims may use the following terms, which are defined to have the following meanings for the purpose of the claims herein. Other definitions may be specified in this document.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The term "owner" (sometimes referred to as a "document owner") is used herein to denote an entity that has an ownership interest in a document and the existence of the document throughout the lifetime of a document. Examples of a document owner include a user or an application.

The term "retention service" is used herein to denote a service that keeps track of each document and, for each document, its document owner(s); the retention service can act as a controlling component for document retention policies.

The term "retention policy" (sometimes referred to as a "document retention policy") is used herein to denote a policy which includes a definition of the lifetime of a document, and which is associated with a specific document owner; the retention policy can be a time-based and/or customized event-based policy.

The term "service registry" is used herein to denote a record of available services in a distributed environment. The service registry may be used to lookup their endpoints.

The term "stakeholder" is used herein to denote an entity that has a legitimate interest in the lifetime of a document. Examples of a document stakeholder include a user or an application.

VI. Implementations and Technical Notes

The above discussion has assumed that the reader has a sufficient background for appreciating the points made. This section provides some implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example, over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments that demonstrate a method and/or system for staging in a cloud environment have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The system used in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for dynamic document retention in a multi-owner environment that includes a document management system, comprising:

registering, by a processor, in a retention service, a plurality of document owners as owners of a same document;

registering, by the processor, in a plug-in registry, as registered retention policies, different document retention policies related to the same document, the different document retention policies being managed, defined, and provided by the plurality of document owners;

triggering, by the processor, a retrieval, from at least one of the plurality of document owners, of an update to at least one of the registered retention policies, which is registered in the plug-in registry, wherein the update includes at least whether the same document is still needed by the at least one of the plurality of document owners or whether the same document may be deleted;

modifying, by the processor, in the retention service, when the update is that the same document may be deleted, document owners registered as owners of the same document by deleting the at least one of the plurality of owners as a registered owner of the same document, and adjusting downward a document-owner-count for the same document that counts the document owners; and performing, by the processor, a first determination, based on the document-owner-count, as to whether there is at least one document owner of the same document, and when the first determination is that there is not at least one owner of the same document, deleting or archiving or moving to a recycle bin, by the processor, the same document, otherwise performing, by the processor, a second determination as to whether each of the owner-defined document retention policies which are registered for the at least one document owner of the same document separately confirms that the same document can be deleted or archived or moved to the recycle bin, and when the second determination is that each of the owner-defined document retention policies which are registered for the at least one document owner of the same document does confirm that the same document can be deleted or archived or moved to the recycle bin, deleting or archiving or moving to the recycle bin, by the processor, the same document, otherwise performing, by the processor, a third determination as to whether an override document retention policy assigned to the same document requires the same document to be archived or deleted or moved to the recycle bin, and when the third determination is that an override document retention policy assigned to the same document does require the same document to be archived or deleted or moved to the recycle bin, deleting, archiving, or moving to the recycle bin, by the processor, the same document, wherein:

the retention service and the plug-in registry are part of a document management system, and the document retention policies managed, defined, and provided by the plurality of document owners may be responsive to events occurring internal to the document management system, to events occurring external to the document management system, and to timing.

2. The method of claim 1, wherein the processor, in the retention service, further modifies the document owners registered as owners of the same document and adjusts the document-owner-count, in response to at least one of:

a request, from one of the document owners, to the retention service, to register ownership of the same document which already exists, the document-owner-count of the same document being adjusted upward;

a request, from one of the document owners, to the retention service, to create the same document which does not already exist, the document-owner-count of the same document being adjusted upward; and a request, from one of the document owners, to the retention service, to end ownership of the same document, the document-owner-count of the same document being adjusted downward.

3. The method of claim 1, wherein:

the triggering of the retrieval of the update to the at least one of the registered retention policies is by a scheduler, as a pull mechanism, based on a predetermined schedule, where the scheduler is part of the document management system.

4. The method of claim 1, wherein an owner type of any of the plurality of document owners may be an application external to the document management system, a user, and a process external to the document management system.

5. The method of claim 1, further comprising registering, by the processor, a default retention policy as an owner-defined retention policy for any of the plurality of document owners that have not provided an owner-defined document retention policy.

6. The method of claim 1, wherein different revisions of the same document are definable as having different document owners.

7. The method of claim 1, further comprising tracking, by the processor, in a registry service, each of plural retention services in the multi-owner environment.

8. The method of claim 1, wherein performing, by the processor, the second determination as to whether each of the owner-defined document retention policies which are registered for the at least one document owner of the same document separately confirms that the same document can be deleted or archived or moved to the recycle bin includes retrieving, by the processor, from the plug-in registry, all of the owner-defined document retention policies of the same document, based on a look-up of all the owners of the same document.

9. A non-transitory computer readable medium comprising executable instructions for performing the method of claim 1.

10. The method of claim 1, wherein the second determination, as to whether each of the document retention policies which are registered for the at least one document owner of the same document separately confirms that the same document can be deleted or archived or moved to the recycle bin, occurs while a retention period or retention periods of each of the document retention policies which are registered for the at least one document owner of the same document have not expired.

11. The method of claim 3, wherein the at least one of the plurality of document owners specifies at creation of the same document whether the at least one of the registered retention policies may be updated by the pull mechanism or may be updated by a different mechanism.

12. The method of claim 1, wherein:

the triggering of the retrieval of the update to at least one of the registered retention policies, as a push mechanism, is by the at least one of the plurality of document owners.

13. A system for dynamic document retention in a multi-owner environment that includes a document management system, comprising:

a memory; and a processor cooperatively operable with the memory, and configured to, based on instructions stored in the memory, register, in a retention service, a plurality of document owners as owners of a same document;

register, in a plug-in registry, as registered retention policies, different document retention policies related to the same document, the different document retention policies being managed, defined, and provided by the plurality of document owners;

trigger, a retrieval, from at least one of the plurality of document owners, of an update to at least one of the registered retention policies, which is registered in the plug-in registry, wherein the update includes at least whether the same document is still needed by the at least one of the plurality of document owners or whether the same document may be deleted;

modify, in the retention service, when the update is that the same document may be deleted, document owners registered as owners of the same document by deleting the at least one of the plurality of owners as a registered owner of the same document, and adjusting downward a document-owner-count for the same document that counts the document owners; and perform a first determination, based on the document-owner-count, as to whether there is at least one document owner of the same document, and when the first determination is that there is not at least one owner of the same document, delete or archive or move to a recycle bin the same document, otherwise perform a second determination as to whether each of the owner-defined document retention policies which are registered for the at least one document owner of the same document separately confirms that the same document can be deleted or archived or moved to the recycle bin, and when the second determination is that each of the owner-defined document retention policies which are registered for the at least one document owner of the same document does confirm that the same document can be deleted or archived or moved to the recycle bin, delete or archive or move to the recycle bin the same document, otherwise perform a third determination as to whether an override document retention policy assigned to the same document requires the same document to be archived or deleted or moved to the recycle bin, and when the third determination is that an override document retention policy assigned to the same document does require the same document to be archived or deleted or moved to the recycle bin, delete, archive, or move to the recycle bin the same document, wherein:

the retention service and the plug-in registry are part of a document management system, and the document retention policies managed, defined, and provided by the plurality of document owners may be responsive to events occurring internal to the document management system, to events occurring external to the document management system, and to timing.

14. The system of claim 13, wherein
the processor is further configured to, in the retention service, modify the document owners registered as owners of the same document and adjust the document-owner-count, in response to at least one of:
   a request, from one of the document owners, to the retention service, to register ownership of the same document which already exists, the document-owner-count of the same document being adjusted upward;
   a request, from one of the document owners, to the retention service, to create the same document which does not already exist, the document-owner-count of the same document being adjusted upward; and
   a request, from one of the document owners, to the retention service, to end ownership of the same document, the document-owner-count of the same document being adjusted downward.

15. The system of claim 13, wherein
the trigger of the retrieval of the update to the at least one of the registered retention policies, as a pull mechanism, is by a scheduler based on a predetermined schedule, where the scheduler is part of the document management system.

16. The system of claim 13, wherein
an owner type of any of the plurality of document owners may be an application external to the document management system, a user, and a process external to the document management system.

17. The system of claim 13, wherein
the processor is further configured to register a default retention policy as an owner-defined retention policy for any of the plurality of document owners that have not provided an owner-defined document retention policy.

18. The system of claim 13, wherein
different revisions of the same document are definable as having different document owners.

19. The system of claim 13, wherein
the processor is further configured to track, in a registry service, each of plural retention services in the multi-owner environment.

20. The system of claim 13, wherein
performing the second determination as to whether each of the owner-defined document retention policies which are registered for the at least one document owner of the same document separately confirms that the same document can be deleted or archived or moved to the recycle bin includes
retrieving, from the plug-in registry, all of the owner-defined document retention policies of the same document, based on a look-up of all the owners of the same document.

21. The system of claim 13, wherein
the second determination, as to whether each of the document retention policies which are registered for the at least one document owner of the same document separately confirms that the same document can be deleted or archived or moved to the recycle bin, occurs while a retention period or retention periods of each of the document retention policies which are registered for the at least one document owner of the same document have not expired.

22. The system of claim 15, wherein
the at least one of the plurality of document owners specifies at creation of the same document whether the at least one of the registered retention policies may be updated by the pull mechanism or may be updated by a different mechanism.

23. The method of claim 12, wherein
the at least one of the plurality of document owners specifies at creation of the same document whether the at least one of the registered retention policies may be updated by the push mechanism or may be updated by a different mechanism.

24. The system of claim 13, wherein
the trigger of the retrieval of the update to at least one of the registered retention policies, as a push mechanism, is by the at least one of the plurality of document owners.

25. The system of claim 24, wherein
the at least one of the plurality of document owners specifies at creation of the same document whether the at least one of the registered retention policies may be updated by the push mechanism or is updated by a different mechanism.

* * * * *